US008261323B2

(12) United States Patent
Banerjee et al.

(10) Patent No.: US 8,261,323 B2
(45) Date of Patent: Sep. 4, 2012

(54) MANAGING LOGICAL SOCKETS

(75) Inventors: Dwip N. Banerjee, Austin, TX (US);
Marco A. Cabrera, Austin, TX (US);
Tommy L. McLane, Hutto, TX (US);
Eduardo L. Reyes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 12/171,951

(22) Filed: Jul. 11, 2008

(65) Prior Publication Data
US 2010/0011414 A1    Jan. 14, 2010

(51) Int. Cl.
*G06F 7/04* (2006.01)
(52) U.S. Cl. .................. 726/3; 726/1; 726/2; 709/223; 709/224; 709/225; 709/226; 709/227; 709/228
(58) Field of Classification Search .................. None
See application file for complete search history.

(56) References Cited

U.S. PATENT DOCUMENTS

| | | | |
|---|---|---|---|
| 7,428,581 B2 * | 9/2008 | Jewett et al. .................. 709/214 |
| 2003/0188013 A1 * | 10/2003 | Nishikado et al. ............ 709/238 |
| 2004/0003085 A1 | 1/2004 | Joseph et al. |
| 2004/0221059 A1 | 11/2004 | Bush |
| 2007/0033260 A1 * | 2/2007 | Grouzdev et al. ............. 709/213 |
| 2007/0130367 A1 * | 6/2007 | Kashyap ....................... 709/245 |

* cited by examiner

*Primary Examiner* — Fikremariam A Yalew
(74) *Attorney, Agent, or Firm* — DeLizio Gilliam, PLLC

(57) ABSTRACT

Network attacks, such as a denial of service (DoS) attack, attempt to exhaust server resources and can cause a network to be unavailable for significant periods of time. Although a firewall can be utilized to defend a system from network attacks, the number of incoming connections created can be controlled to defend the system against network attacks. An operating system creates connections, known as sockets, on one or more logical ports. Incoming connections are connections whose creation requests originate from a source outside the operating system. Functionality to control socket creation can be implemented within the operating system, thus allowing a system to be placed directly on a network without a firewall. Implementing defense against network attacks within an operating system reduces the additional cost of having firewall products, and can lead to more efficient network configurations.

18 Claims, 5 Drawing Sheets

MANAGING LOGICAL SOCKETS

BACKGROUND

Embodiments of the inventive subject matter generally relate to the field of networking, and, more particularly, to managing creation of logical sockets.

Denial of service (DoS) attacks seek to make network resources unavailable to their intended users by exhausting memory by repeatedly causing new connections (i.e., sockets) to be created. Each socket, which is a data structure, consumes memory. DoS attacks can be very detrimental to businesses such as banks, call centers and hospitals that rely on networks to access timely information, because it can take hours to restore an intricate network after an attack.

SUMMARY

Embodiments include a method directed to accessing a structure that indicates a plurality of logical socket allocation policies to select a first of the plurality of socket allocation policies that corresponds to a logical port, wherein each of the plurality of logical socket allocation policies governs logical socket allocation for one or more ports. It is determined if the first logical socket allocation policy allows for allocation of a logical socket for a network source to communicate via the logical port. A logical socket is allocated for the network source to communicate via the logical port if allowed by the first logical socket allocation policy.

BRIEF DESCRIPTION OF THE SEVERAL DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to the Transmission Control Protocol (TCP), embodiments can be implemented in other types of networks including Stream Control Transmission Protocol (SCTP), etc. In other instances, well-known instruction instances, protocols, structures and techniques have not been shown in detail in order not to obfuscate the description.

Network attacks, such as a denial of service (DoS) attack, attempt to exhaust server resources and can cause a network to be unavailable for significant periods of time. Although a firewall can be utilized to defend a system from network attacks, the number of incoming connections created can be controlled to defend the system against network attacks. An operating system creates connections, also referred to as sockets, on one or more logical ports. An incoming connection or socket is an incoming connection or socket created in response to a request originating from a remote source. Functionality to control socket creation can be implemented within the operating system, thus allowing a system to be placed directly on a network without a firewall. Implementing defense against network attacks within an operating system reduces the additional cost of having firewall products, and can lead to more efficient network configurations.

Figure 1:
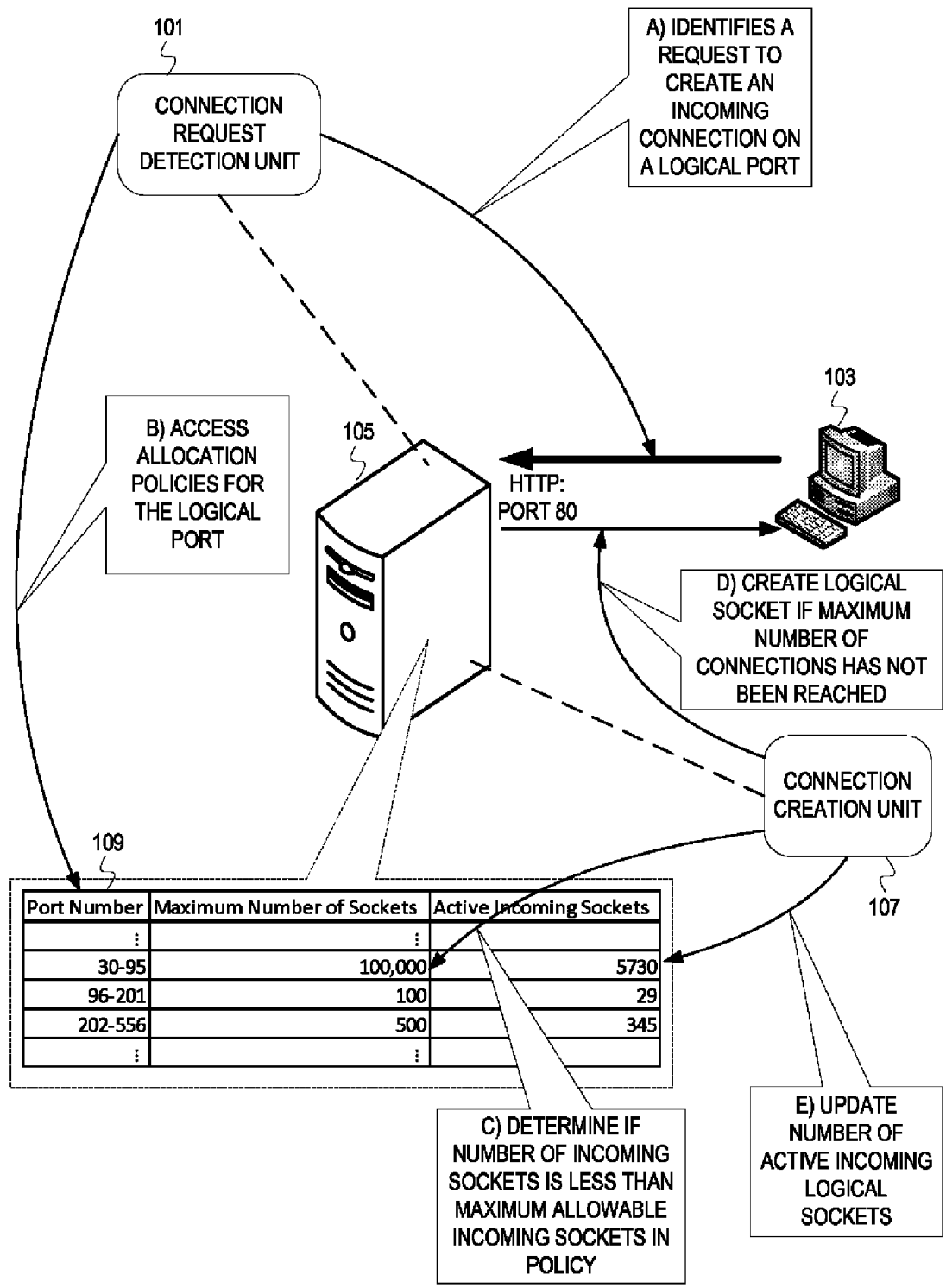
FIG. 1 depicts an example of creating a connection based on a policy.

FIG. 1 depicts a conceptual example of creating a connection based on a policy. A server 105 comprises a connection request detection unit 101 and a connection creation unit 107. At stage A, the connection request detection unit 101 identifies a request from a source 103 to create an incoming connection on one of a plurality of logical ports of server 105. The incoming connection is requested on port 80 which provides service for Hypertext Transfer Protocol (HTTP). For example, in TCP, a request to create an incoming connection is made when the server receives a response from a source to a synchronize acknowledgement (SYN ACK) packet. At stage B, the connection request detection unit 101 accesses logical socket allocation policies 109 for the logical port existing on the server 105. The logical socket allocation polices 109 govern the number of logical sockets that can be allocated to incoming connections on each of the plurality of logical ports of server 105 or the maximum number of incoming logical sockets shared between a group of logical ports. The logical socket allocation policies 109 may also govern maximum number of logical sockets allocated to a single source (e.g., computer, personal digital assistant, server, etc.), different maximum numbers of incoming logical sockets for ports at different times of day, etc. Although not shown in FIG. 1, the server 105 is capable of creating logical sockets for outgoing connections. Outgoing connections are connections originating from a resource internal to the server. Policies apply to incoming connections, so outgoing connections are not limited and can be created at any time.

The logical socket allocation policies 109 can be indicated by a system administrator and stored in a structure with an entry for each policy. Each entry in the structure stores a policy, logical port numbers governed by the policy and the number of incoming logical sockets on those logical ports. For example, a system administrator may want to limit the total number of incoming logical sockets on two groups of ports 100-200 and 1000-1100. A policy can be defined to limit the total number of logical sockets to be shared among each group of ports to 100. Ports 100-200 may have at most 100 incoming logical sockets while ports 1000-1100 may have another 100 incoming logical sockets. The same policy may be applied to a subset of the logical ports, but the same policy is not applied to the entire set of logical ports. For example, in UNIX there are 65536 possible logical port numbers. A system administrator does not apply a single policy to all 65536 ports. The system administrator applies at least two unique policies. In addition, Connection policies are mutually exclusive by port number. For example, two different connection policies are not applied to the same logical port.

In some cases, a system may not use all of the available logical ports. For example, a server may not utilize a mail server. Therefore, a policy does not need to be indicated for unused ports. The system administrator is responsible for indicating logical socket allocation policies for each logical port in use. A list of active policies and corresponding port numbers can be displayed by the system at the request of the system administrator.

At stage C, the connection creation unit 107 determines if the current number of incoming logical sockets on the logical port is less than the maximum number of incoming logical sockets allowed for the port in the logical socket allocation policy. If the current number of incoming logical sockets on the logical port is less than the maximum number of logical sockets at stage D, the connection creation unit 107 creates the incoming logical socket between source 103 and server 105. The operating system maintains a record of the number of incoming logical sockets. At stage E, the current number of incoming logical sockets on the logical port is updated in the policy structure 109.

In this example, the incoming request was made in response to an end-user's desire to load a webpage located on the server. In other examples, the request may be made by a server (e.g., mail server), an application running in the background on a computer, etc.

Figure 2:
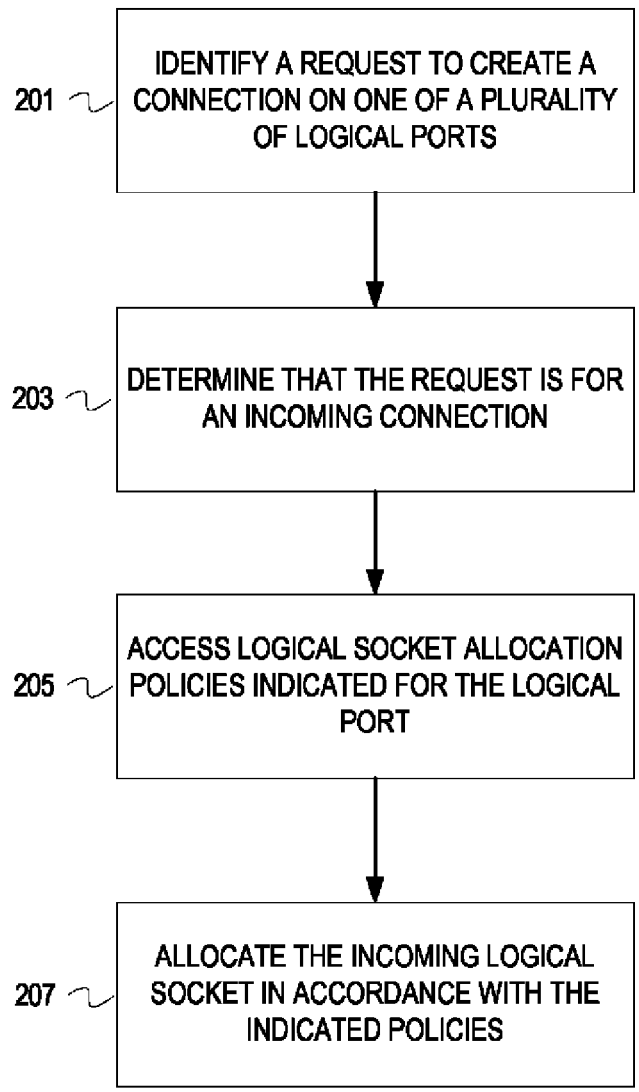
FIG. 2 depicts a flowchart of example operations for creating incoming connections based on a connection policy for a logical port.

FIG. 2 depicts a flowchart of example operations for creating incoming connections based on a connection policy for a logical port. Flow begins at block 201, where a request to create a logical socket on one of a plurality of logical ports is identified. The request to create a connection can originate from a resource internal to the server or from an external source (e.g., computer, personal digital assistant, mobile phone, etc.).

At block 203, it is determined that the request is for an incoming connection. In one embodiment, an embryonic socket is created as a place holder when the server receives or initiates connection requests, but the connections have not yet been fully established. The request is for an incoming connection if the embryonic socket has a parent socket. If the embryonic socket does not have a parent, it is an outgoing request. In other embodiments, determining that the request is for an incoming connection comprises examining the source of the request.

At block 205, logical socket allocation policies for the indicated logical port are accessed. Logical socket allocation policies govern one or more of maximum number of incoming logical sockets for the plurality of logical ports, number of incoming logical sockets allowed for connection sources, etc. Note that outgoing connections are not governed by connection policies.

At block 207, the logical socket is created in accordance with indicated logical socket allocation policies for the logical port. For example, a logical port may limit the number of logical sockets to 1000. If the number of logical sockets is less than 1000, a logical socket will be created. If the number of logical sockets is 1000, the logical socket will not be created.

Figure 3:
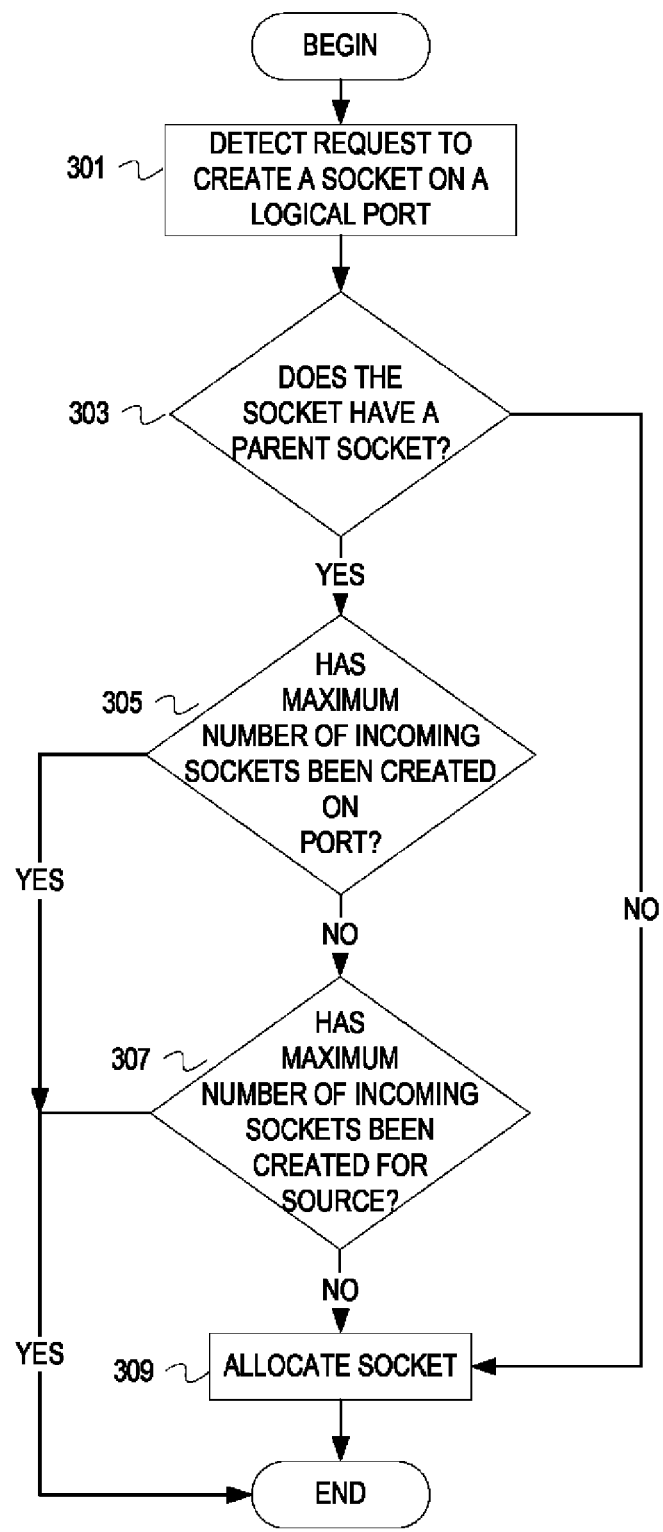
FIG. 3 is a flowchart depicting example operations for governing incoming connections based on policies.

FIG. 3 is a flowchart depicting example operations for governing incoming connections based on policies. Flow begins at block 301, where a request to create a logical socket on a logical port is detected by an operating system. Requests to create a logical socket may come from resources internal to the operating system or outside sources (e.g., computers, personal digital assistants, mobile phones, etc.).

At block 303, it is determined if the logical socket has a parent socket. Sockets for incoming connections have parent sockets. Sockets that do not have parents are outgoing connections and are treated normally by the operating system. Logical socket allocation policies do not limit the resources used by outgoing connections. The operating system determines if a parent socket exists, but does not determine which socket is the parent. For example, a socket may have a pointer to a parent socket. The operating system determines that the pointer exists, but does not necessarily follow the pointer to the parent socket. Embodiments can follow the pointer to confirm that the pointer references a valid or active logical parent socket. If the socket has a parent socket, flow continues at block 305. If the socket does not have a parent socket, flow continues at block 309.

At block 305, it is determined if the maximum number of logical sockets has been created on the logical port. In addition, there may be a policy that limits the number of connections for a range of logical ports. A counter is maintained for the number of logical sockets for each logical port and/or range of ports. If the maximum number of logical sockets has not been created on the logical port, flow continues at block 307. If the maximum number of logical sockets has been created on the logical port, flow ends.

At block 307, it is determined if the maximum number of logical sockets has been created for a source. The number of logical sockets that can be created by a source is limited so that one source cannot take up all of the available logical sockets for the logical port. In some embodiments, the maximum number of logical sockets available to one source may be a constant. In other embodiments, the maximum number of logical sockets available to one source may be changed dynamically based on an algorithm. For example, a source may be limited to half the number of sockets currently available. If there are 1000 sockets available, a single source would be limited to 500 sockets, leaving 500 remaining available sockets. A second source may be connected to another 250 sockets and so on. If the maximum number of sockets has not been created for the source, flow continues at block 309. If the maximum number of sockets has been created for the source, flow ends.

At block 309, the logical socket is allocated and flow ends. If the connection is an incoming logical socket, the socket is allocated by the accept system call. If the connection is an outgoing connection, the socket is allocated by the system socket call. The counters maintaining the number of logical sockets and the number of logical sockets allocated to a source are incremented when a socket is allocated by the accept system call. When a socket is closed, the counters maintaining the number of incoming logical sockets and the number of incoming connections allocated to a source are decremented.

Figure 4:
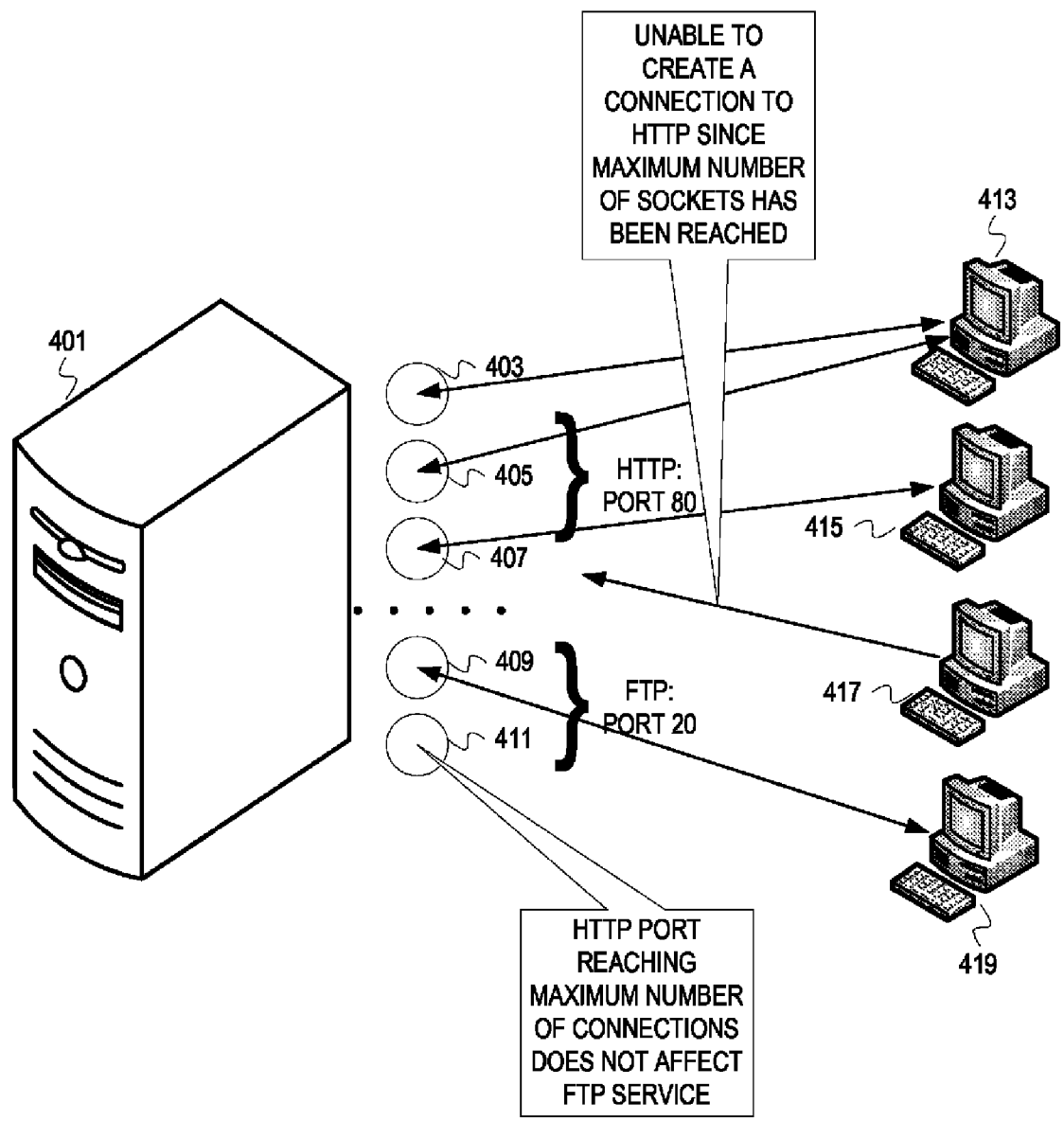
FIG. 4 is an example depicting the use of policies to limit the number of incoming connections on logical ports.

FIG. 4 is an example depicting the use of policies to limit the number of incoming connections on logical ports. A server 401 has five available logical sockets 403, 405, 407, 409, and 411. Three logical sockets 403, 405, and 407 are available for logical port 80 which provides service for HTTP. Two logical sockets 409 and 411 are available for logical port 20 which provides service for File Transfer Protocol (FTP). A source 413 is connected to both logical sockets 403 and 405. A source 415 is connected to logical socket 407. A source 419 is connected to logical socket 409.

A source 417 sends a connection request to logical port 80. Since there are no available logical sockets on logical port 80, a connection will not be created for the source 417. Limiting the number of logical sockets for logical port 80 allows other services such as FTP on logical port 20 to continue even when all connections for logical port 80 have been exhausted. Connection requests on one logical port cannot consume all system resources to shut down services to other logical ports.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 3, the operations for detecting a request and determining if the socket has a parent may be performed in parallel.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
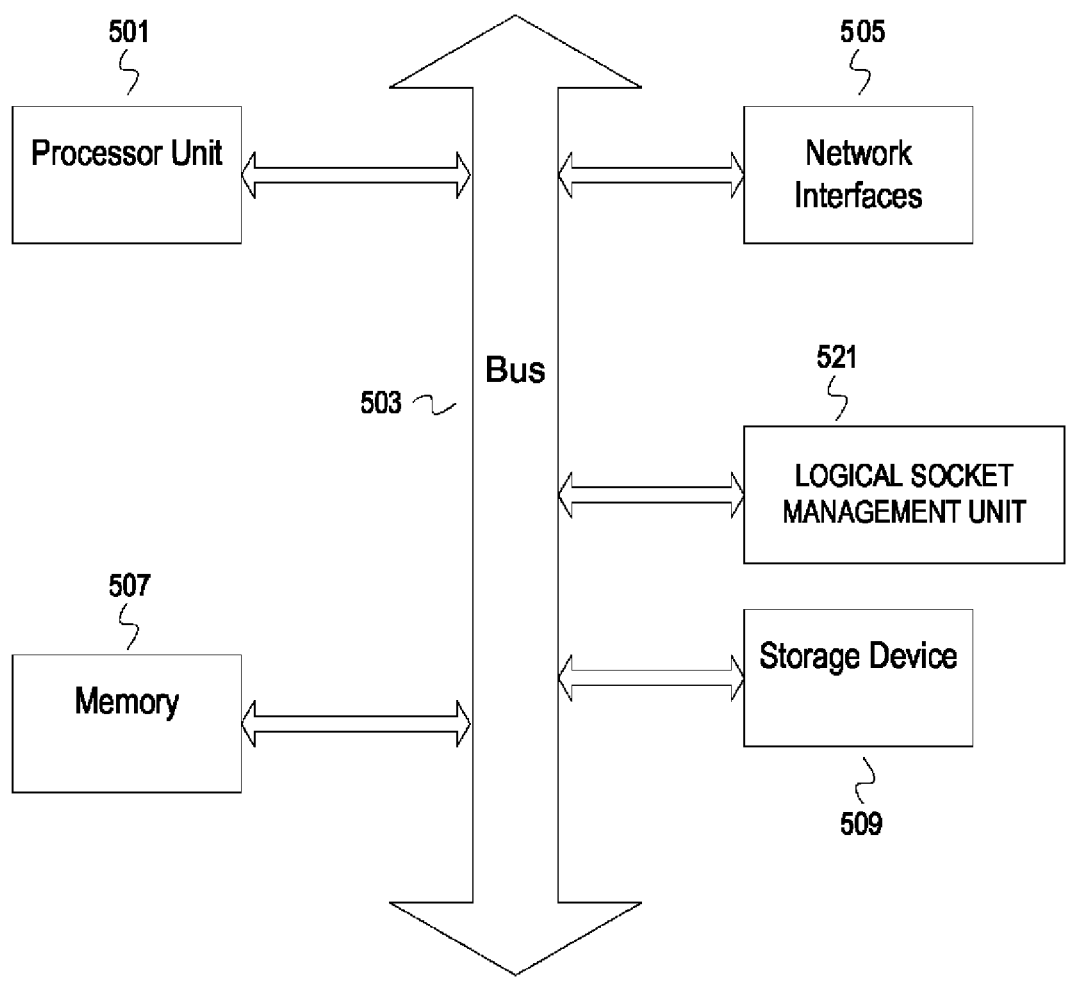
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also includes a logical socket management unit 521. The logical socket management unit 521 detects requests to create incoming connections on logical ports, determines policies governing incoming connections on the logical ports, and creates connections in accordance with the policies. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for limiting the number of incoming connections on logical ports as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:

receiving, by a computer, a request from a network source to create a logical socket on a logical port of one or more logical ports;

accessing, by the computer, a structure that indicates a plurality of logical socket allocation policies to select a first of the plurality of logical socket allocation policies that corresponds to the logical port, wherein each of the plurality of logical socket allocation policies governs logical socket allocation for one or more ports, wherein the logical allocation policies govern at least one of the number of logical sockets that are allocated to the one or more logical ports, a maximum number of logical sockets shared between a grouping of two or more of the one or more logical ports, and a maximum number of logical sockets for the computer;

determining, by the computer, if the first logical socket allocation policy allows for allocation of the logical socket for the network source to communicate via the logical port, wherein said determining, by the computer, if the first logical socket allocation policy allows for allocation of the logical socket for the network source to communicate via the logical port comprises determining, by the computer, if allocation of the logical socket will exceed a limit of a number of logical sockets allowed to be allocated under the first of the plurality of logical socket allocation policies; and allocating, by the computer, a logical socket for the network source to communicate via the logical port if allowed by the first logical socket allocation policy.

2. The method of claim 1, wherein the plurality of logical socket allocation policies governs mutually exclusive ports.

3. The method of claim 1, wherein said allocating, by the computer, the logical socket for the network source to communicate via the logical port if allowed by the first logical socket allocation policy comprises associating the logical socket with the logical port.

4. The method of claim 1 further comprising populating, by the computer, the structure with the plurality of socket allocation connection policies.

5. The method of claim 1, wherein said determining, by the computer, if the first logical socket allocation policy allows for allocation of the logical socket for the network source to communicate via the logical port further comprises determining, by the computer, if allocation of the logical socket will exceed a limit on a number of logical sockets to be allocated for the network source.

6. The method of claim 5, wherein said determining, by the computer, if allocation of the logical socket will exceed the limit on the number of logical sockets to be allocated for the network source comprises comparing, by the computer, a number of active incoming logical sockets for the network source and the limit on the number of logical sockets to be allocated for the network source.

7. The method of claim 5 further comprising updating, by the computer, a number of active incoming logical sockets allocated under the first of the plurality of logical socket allocation policies if the logical socket is allocated.

8. The method of claim 1, wherein the structure comprises one of a hash table, an array, a hardware lookup table, and a directory.

9. One or more machine-readable computer storage devices having instructions stored therein, which when executed by a set of one or more processor units causes the set of one or more processor units to perform operations that comprise:
receiving a request from a network source to create a logical socket on a logical port of one or more logical ports;
accessing a structure that indicates a plurality of logical socket allocation policies to select a first of the plurality of socket allocation policies that corresponds to the logical port, wherein each of the plurality of logical socket allocation policies governs logical socket allocation for one or more ports, wherein the logical allocation policies govern at least one of the number of logical sockets that are allocated to the one or more logical ports, a maximum number of logical sockets shared between a grouping of two or more of the one or more logical ports, and a maximum number of logical sockets for a computer;
determining if the first logical socket allocation policy allows for allocation of the logical socket for the network source to communicate via the logical port, wherein said operation of determining if the first logical socket allocation policy allows for allocation of the logical socket for the network source to communicate via the logical port further comprises determining if allocation of the logical socket will exceed a limit on a number of logical sockets to be allocated for the network source; and
allocating a logical socket for the network source to communicate via the logical port if allowed by the first logical socket allocation policy.

10. The machine-readable computer storage devices of claim 9, wherein the plurality of logical socket allocation policies governs mutually exclusive ports.

11. The machine-readable computer storage devices of claim 9, wherein said operation of allocating the logical socket for the network source to communicate via the logical port if allowed by the first logical socket allocation policy comprises associating the logical socket with the logical port.

12. The machine-readable computer storage devices of claim 9, wherein the operations further comprise populating the structure with the plurality of socket allocation connection policies.

13. The machine-readable computer storage devices of claim 9, wherein said operation of determining if the first logical socket allocation policy allows for allocation of the logical socket for the network source to communicate via the logical port comprises determining if allocation of the logical socket will exceed a limit of a number of logical sockets allowed to be allocated under the first of the plurality of logical socket allocation policies.

14. The machine-readable computer storage devices of claim 9, wherein said operation of determining if allocation of the logical socket will exceed the limit on the number of logical sockets to be allocated for the network source comprises comparing a number of active incoming logical sockets for the network source and the limit on the number of logical sockets to be allocated for the network source.

15. The machine-readable computer storage devices of claim 9, wherein said allocating a logical socket for the network source to communicate via the logical port if allowed by the first logical socket allocation policy further comprises updating the number of active incoming logical sockets on each the plurality of logical ports.

16. The machine-readable computer storage devices of claim 9, wherein said allocating a logical socket for the network source to communicate via the logical port if allowed by the first logical socket allocation policy further comprises updating a number of incoming logical sockets allocated to each network source.

17. An apparatus comprising:
a set of one or more processing units;
a network interface; and
one or more machine-readable media having stored therein a program product, which when executed by the set of one or more processor units causes the set of one or more processor units to perform operations that comprise,
receiving a request from a network source to create a logical socket on a logical port of one or more logical ports;
accessing a structure that indicates a plurality of logical socket allocation policies to select a first of the plurality of socket allocation policies that corresponds to the logical port, wherein each of the plurality of logical socket allocation policies governs logical socket allocation for one or more ports, wherein the logical allocation policies govern at least one of the number of logical sockets that are allocated to the one or more logical ports, a maximum number of logical sockets shared between a grouping of two or more of the one or more logical ports, and a maximum number of logical sockets for the apparatus;
determining if the first logical socket allocation policy allows for allocation of the logical socket for the network source to communicate via the logical port, wherein said operation of determining if the first logical socket allocation policy allows for allocation of the logical socket for the network source to communicate via the logical port further comprises determining if allocation of the logical socket will exceed a limit on a number of logical sockets to be allocated for the network source; and allocating a logical socket for the network source to communicate via the logical port if allowed by the first logical socket allocation policy.

18. The apparatus of claim 17, wherein the logical allocation policies govern the number of logical sockets that are allocated to the one or more logical ports, a maximum number of logical sockets shared between a grouping of two or more of the one or more logical ports, and a maximum number of logical sockets for the apparatus.

* * * * *